United States Patent
Evans et al.

(10) Patent No.: US 11,405,296 B1
(45) Date of Patent: Aug. 2, 2022

(54) AUTOMATED VALIDATION OF NETWORK MATRICES

(71) Applicant: Amazon Technologies, Inc., Seattle, WA (US)

(72) Inventors: John William Evans, Frome (GB); Rama Subramanian Amaravathi Jayachandar, Seattle, WA (US); Fabrizio Scimia, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/900,666

(22) Filed: Jun. 12, 2020

(51) Int. Cl.
*H04L 43/0882* (2022.01)
*H04L 43/0888* (2022.01)
*H04L 43/106* (2022.01)
*H04L 45/12* (2022.01)
*H04L 43/0829* (2022.01)
*H04L 45/50* (2022.01)
*H04L 43/16* (2022.01)

(52) U.S. Cl.
CPC ...... *H04L 43/0882* (2013.01); *H04L 43/0829* (2013.01); *H04L 43/0888* (2013.01); *H04L 43/106* (2013.01); *H04L 43/16* (2013.01); *H04L 45/123* (2013.01); *H04L 45/50* (2013.01)

(58) Field of Classification Search
CPC ............. H04L 43/0882; H04L 43/0829; H04L 43/0888; H04L 43/106; H04L 43/16; H04L 45/123; H04L 45/50
See application file for complete search history.

(56) References Cited

U.S. PATENT DOCUMENTS

| | | | |
|---|---|---|---|
| 6,785,240 B1* | 8/2004 | Cao | H04L 43/045 370/238 |
| 7,293,086 B1* | 11/2007 | Duffield | H04L 43/00 709/224 |
| 7,729,269 B1* | 6/2010 | Nucci | H04L 45/12 370/252 |
| 7,903,573 B2* | 3/2011 | Singer | H04L 45/00 370/252 |
| 9,439,081 B1* | 9/2016 | Knebl | H04W 16/18 |
| 2013/0212578 A1* | 8/2013 | Garg | H04L 41/0668 718/1 |
| 2015/0195149 A1* | 7/2015 | Vasseur | H04L 41/147 370/252 |
| 2017/0099210 A1* | 4/2017 | Fardid | H04L 43/08 |
| 2017/0118100 A1* | 4/2017 | Xu | H04L 41/14 |
| 2021/0029030 A1* | 1/2021 | Choudhury | H04L 41/0816 |

* cited by examiner

*Primary Examiner* — Joe Chacko
(74) *Attorney, Agent, or Firm* — Klarquist Sparkman, LLP

(57) ABSTRACT

Passive monitoring by network devices can be used to validate a network traffic matrix, which aggregates end-to-end traffic demands between source-destination pairs in the network. Using information regarding the physical and logical topology of the network during the same time period as the traffic matrix, a model of the network is generated. Traffic load on each link between network devices in the network is predicted using the model and the traffic matrix. Actual traffic loads on each link are determined from the passive monitoring data from each network device. By comparing the predicted load with the actual load on each link, a measure of the validity or accuracy of the traffic matrix is obtained. The disclosed techniques can also be applied to validate a network loss matrix.

18 Claims, 6 Drawing Sheets

AUTOMATED VALIDATION OF NETWORK MATRICES

BACKGROUND

Large computer networks, often used in cloud computing or other applications, may contain hundreds or thousands of network devices of several types, such as switches, routers, and hubs. Data from a source endpoint (e.g., a host computer or a network device connecting to another network) travels to a destination endpoint via paths defined by links between multiple devices of the network. In packet-switched networks, the data is formatted into units, termed packets, that travel along the paths between endpoints. To design or manage such large computer networks, traffic matrices are often employed. A traffic matrix is the aggregation of end-to-end traffic demands between respective source-destination pairs in the network over a particular period of time. By simulating the topology of the network and overlaying the traffic matrix, different network scenarios can be analyzed to understand the impact of link or device failures, traffic growth, or network design changes. The accuracy of the traffic matrix is thus important in order to draw valid conclusions from these simulations. Existing systems, however, are unable to assess the accuracy or validity of a generated traffic matrix.

DETAILED DESCRIPTION

A traffic matrix, which aggregates end-to-end traffic demands between respective source-destination pairs of network devices in the computer network, can be validated based on passive monitoring data. As used herein, passive monitoring refers to monitoring by each network device of the packets transmitted and packets lost (e.g., dropped or not transmitted due to an error) over a period of time by its respective interfaces. The data regarding packets transmitted can be used to determine actual traffic load (e.g., bytes per unit time) or utilizations (e.g., percentage of capacity) of each link in the computer network. Using physical topology information (e.g., location of network devices and physical connections between network devices) and logical topology information (e.g., routing or forwarding rules) of the computer network that corresponds in time to the passive monitoring, a model of the computer network is generated. The model can use the traffic matrix, which also corresponds in time to the passive monitoring, as an input to predict traffic load or utilizations of each link.

In some embodiments, a loss matrix can be generated in addition to or in place of a traffic matrix. The loss matrix can aggregate end-to-end traffic loss between respective source-destination pairs of network devices in the computer network. The passive monitoring regarding packets lost can be used to determine actual loss of each link in the computer network. Similar to the traffic matrix, the network model based on topology information can use the loss matrix, which also corresponds in time to the passive monitoring, as an input to predict traffic loss of each link.

The predicted values can be compared to the actual values to provide a measure of validity or accuracy of the network matrices (e.g., the traffic matrix and/or the loss matrix). For example, the difference between the actual and predicted values for each link can be calculated. In some embodiments, links that have differences exceeding a predetermined threshold value can be identified or flagged. Alternatively or additionally, source-destination pairs in the traffic matrix whose simulated end-to-end paths (e.g., based on the model) include links that have differences exceeding a predetermined threshold value can be identified or flagged. In some embodiments, an error report based on the comparison can be generated. Based on the error report, an owner or operator of the computer network may take remedial action to correct the network matrix or the underlying process for generating the network matrix. Alternatively or additionally, the comparison can be used by an optimization algorithm to automatically adjust the network matrix or its corresponding generation process to reduce differences between the predicted values and the actual values.

Figure 1:
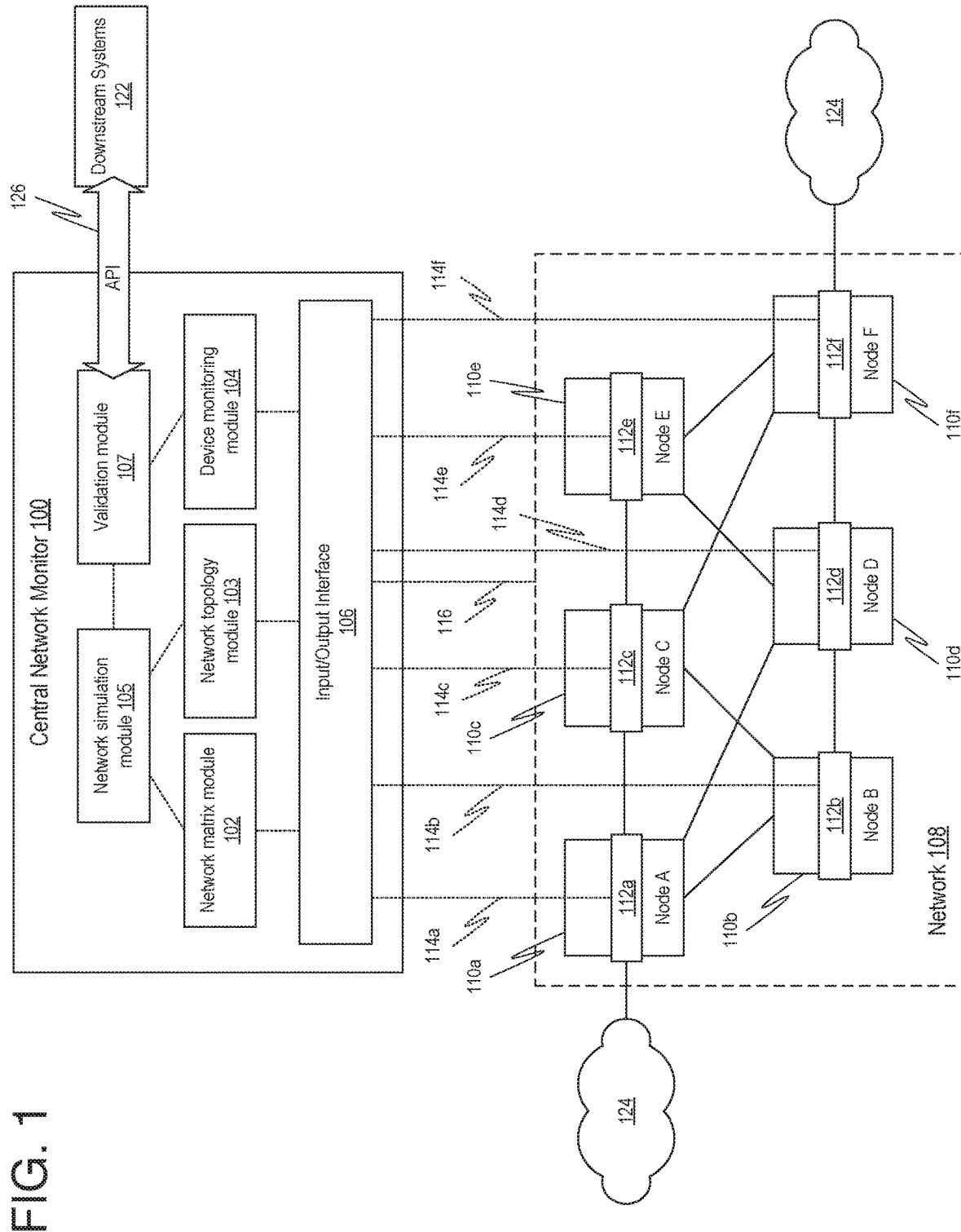
FIG. 1 is a simplified schematic diagram of a system for automated validation of network traffic or loss matrices, according to one or more embodiments of the disclosed subject matter.

FIG. 1 illustrates an exemplary system 100 for automated validation of network matrices (e.g., traffic matrix and/or loss matrix) in a computer network 108. The computer network can be a geographically distributed collection of nodes 110 interconnected by communication links and segments for transporting data between end nodes or endpoints (e.g., node A 110*a* and node F 110*f*), such as personal computers and workstations, connections to an external network 124 (e.g., via border nodes), or other devices, such as sensors, etc. Each node 110 can be a network device, for example, a network router or switch. Alternatively, each node 110 can represent an interface of a network device. As used herein, interfaces refer to ports of the network device that provide connectivity to other devices of the network. As such, each network device may have multiple interfaces, for example, input ports and output ports. Although only six nodes 110*a*-110*f* are shown in FIG. 1 for simplicity of description, it will be appreciated that any number of nodes 110 can be provided in network 108. Indeed, in practical implementations, network 108 would include a large number of nodes 110, for example, on the order of hundreds or thousands.

Network 108 and/or external network 124 can be any type of network, such as a local area network (LAN) or a wide area network (WAN). LANs typically connect nodes over dedicated private communication links located in the same general physical location, such as a building or campus. WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used. For example, network 108 may constitute a LAN while external network 124 constitutes a WAN or an intervening network that connects network 108 to the Internet.

Each node 110a-110f can include a respective agent 112a-112f that monitors packets transmitted and packets dropped by the node. For example, the agents 112a-112f can be respective software modules operating on a network device. Alternatively, agents 112a-112f can be separate devices coupled to the respective node for monitoring performance thereof. The agents 112a-112f are configured to compile and periodically (e.g., every minute) transmit data regarding the amount of packets transmitted and the amount of packets lost (e.g., packets dropped or otherwise not transmitted due to an error) by the respective node 110a-110f to a device monitoring module 104 of network monitoring system 100 via respective communication links 114a-114f and input/output interface 106. In some embodiments, the agents 112a-112f are configured to transmit the data to device monitoring module 104 in response to a polling request from the device monitoring module 104. For example, the agents 112a-112f and device monitoring module 104 can operate in accordance with Simple Network Management Protocol (SNMP). In other embodiments, the agents 112a-112f are configured to transmit the data to device monitoring module 104 automatically without the need for any polling. The automatic transmission of data from the agents 112a-112f may be continuous or according to a predetermined schedule. For example, communication between agents 112a-112f and device monitoring module 104 can be by streaming telemetry. The data from the agents 112a-112f can be used, for example by the device monitoring module 104, to determine measured traffic load or utilization, or measured traffic lost for each link between nodes 110a-110f over a particular period of time.

In addition to the device monitoring module 104 and input/output interface 106, the network monitoring system 100 can include a network topology module 103. The network topology module 103 is configured to generate a model of the network based on network topology information. For example, for each source-destination pair of nodes, the model can infer an end-to-end path composed of individual links between nodes in the network. In some embodiments, the network topology module 103 uses both physical topology information (e.g., location of network devices and physical connections between network devices) and logical topology information (e.g., routing or forwarding logic of the network devices) to the model. The network topology module 103 can receive the topology information from network 108, for example, via a separate communication link 116 with a network-wide administration device (not shown) and/or from each node 110a-110f via the respective data communication links 114a-114f. Alternatively or additionally, the network topology module 103 is configured to perform active probing of network 108 to determine travel paths from each source to each destination. For example, the network topology module 104 can employ a route-tracing function (e.g., traceroutes or tracert) for a particular source-destination pair.

The network monitoring system 100 can further include a network matrix module 102. The network matrix module 102 is configured to generate a traffic matrix and/or a loss matrix for network 108. The traffic matrix aggregates end-to-end traffic demands between respective source-destination pairs of nodes 110 in network 108, while the loss matrix aggregates end-to-end losses between respective source-destination pairs of nodes 110 in network 108. In some embodiments, the traffic matrix is built by sampling of traffic flows at nodes 110 or along links between nodes 110 within network 108, for example, using software such as NetFlow, IPFIX, sFlow, jFlow, or other traffic flow analysis software. Alternatively or additionally, the traffic matrix and/or the loss matrix is estimated using data of packet transmission and/or packet loss at each node, for example, via the passive monitoring data received from agents 112 by device monitoring unit 103. Alternatively or additionally, the traffic matrix can be formed based on statistics that implicitly define traffic demands, such as label-switched path (LSP) statistics in multi-protocol switching (MPLS) routing techniques and IP tunnel statistics in IP tunneling communications. Other methodologies for forming the traffic matrix and/or loss matrix, or combinations thereof, are also possible according to one or more contemplated embodiments.

In some embodiments, the traffic matrix and/or loss matrix may be generated taking into packet loss as well as packet transmission. For example, data regarding the packet transmission rate and drop rate can be passively collected for each network device and transmitted to a network monitoring unit, which compiles the data and generates a series of simultaneous equations that represent traffic demand and loss between the discrete network devices along the paths connecting respective source-destination pairs. By determining an optimal solution to the simultaneous equations, an estimate of end-to-end traffic loss and corresponding traffic demand, which takes into account packet loss at each network device, can be generated for each source-destination pair. The optimal solution can be formed as the traffic matrix, which aggregates the source-to-destination traffic demands, and the loss matrix, which aggregates the source-to-destination traffic losses.

The network monitoring system 100 can further include a network simulation module 105. The network simulation module 105 receives the network model from the network topology module 103 and receives the network matrix from the network matrix module 102. Using the network model and the network matrix, the network simulation module 105 can predict performance (e.g., traffic load or utilization, traffic loss) at each link. For example, the simulation module 105 can apply the end-to-end traffic loads suggested by the traffic matrix to each link along the corresponding end-to-end path suggested by the model, and then calculate the traffic load for each link resulting from the combination of different end-to-end transmissions over that link. This yields a predicted traffic load or utilization at each link. A similar analysis applies to the loss matrix, where a traffic loss is predicted for each link based on the end-to-end loss suggested by the traffic loss.

The network monitoring system 100 can further include a validation module 107, which receives the predicted values from the network simulation module 105 and the measured values from the device monitoring module 104. The validation module 107 is configured to compare the predicted values to the measured values to assess validity or accuracy of the corresponding network matrix. The network matrix module 102, the network topology module 103, and the device monitoring module 104 can perform their respective processes with respect to the same time interval of network operation. That is, the passive monitoring data received and processed by device monitoring module 104 is with respect to packets transmitted or lost in network 108 during a first time period. The model determined by network topology module 103 based on topology information corresponding to that first time period, and the network matrices generated by network matrix module 102 is based on data for that first time period. For example, the traffic matrix and the model may be generated every hour, and the passive monitoring data from agents 112 can be aggregated over the same hour time frame (e.g., received every minute and compiled together over the hour). The results predicted by the network simulation module 105 are thus comparable to the measured results from the device monitoring module 104. Changes to the physical topology or logical topology of network may require generation of a new model by the network topology module 103 to maintain correspondence between the results predicted by network simulation module 105 and the measured results from device monitoring module 104.

For example, the validation module 107 can compare the predicted utilization or loss for each link to the corresponding measured utilization or loss by calculating a difference between the predicted and measured values. In some embodiments, the validation module 107 can identify or flag links as non-compliant based on, for example, a difference for the link that exceeds a predetermined threshold value, that is outside a predetermined range, or that exceeds a certain percentage of the actual value. Alternatively or additionally, the validation module 107 can identify or flag those source-destination pairs in the network matrix that include such non-compliant links. For example, if the traffic utilization for the link between node C 112c and node F 112f is predicted by network simulation module 105 to be 20%, but the measured utilization is determined by device monitoring module 104 to be 50%, the link between node C 112c and node F 112f may be flagged as non-compliant and a corresponding error generated. The entry in the traffic matrix corresponding to the end-to-end path from node A 112a to node F 112f, which may be determined by network topology module 103 to include the link between node C 112c and node F 112f, may also be flagged as non-compliant. In some embodiments, the validation module 107 can generate an error report, which may include the results of the comparison, for example, the difference calculation for each link.

Communication of the result of the comparison by the validation module 107 to one or more downstream systems or services 122 can be in the form of network service requests 126. Network services are commonly used in cloud computing. A network service is a software function provided at a network address over the web or the cloud. Clients initiate network service requests to servers and servers process the requests and return appropriate responses. The client network service requests are typically initiated using, for example, an API request. For purposes of simplicity, network service requests will be generally described herein as API requests, but it is understood that other network service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request.

For example, downstream system 122 can be a user interface that receives the error report or other comparison output from validation module 107 of network monitoring system 100. The user interface can allow an operator or provider of network 108 to take corrective action or to confirm that the corresponding traffic matrix and/or loss matrix is validated. For example, the user interface can alert an operator to links that are non-compliant. The operator can thus investigate the non-compliance, for example, by confirming traffic flow monitors are properly enabled for that link or by checking if traffic on that link is somehow bypassing traffic flow monitors. Alternatively or additionally, the downstream can be an optimization module, which automatically adjusts the network matrix itself or the underlying process for generating the network matrix to reduce the differences calculated by the validation module 107. For example, such adjustment may occur by an iterative feedback process, where matrix generation, model generation, passive monitoring, simulation, and validation processes performed by network monitoring system 100 are repeated after adjustment of the network matrix generation process by the downstream optimization module. Other downstream systems or services that can interact with network monitoring system 100 via API 126 are also possible according to one or more contemplated embodiments.

It should be appreciated that the illustrated embodiment of FIG. 1 is greatly simplified, and that practical implementations would involve hundreds or thousands of nodes and/or endpoints. The corresponding generation of network matrix, model generation, passive monitoring, simulation, and validation may be substantially complex and may require significant computing power.

Figure 2:
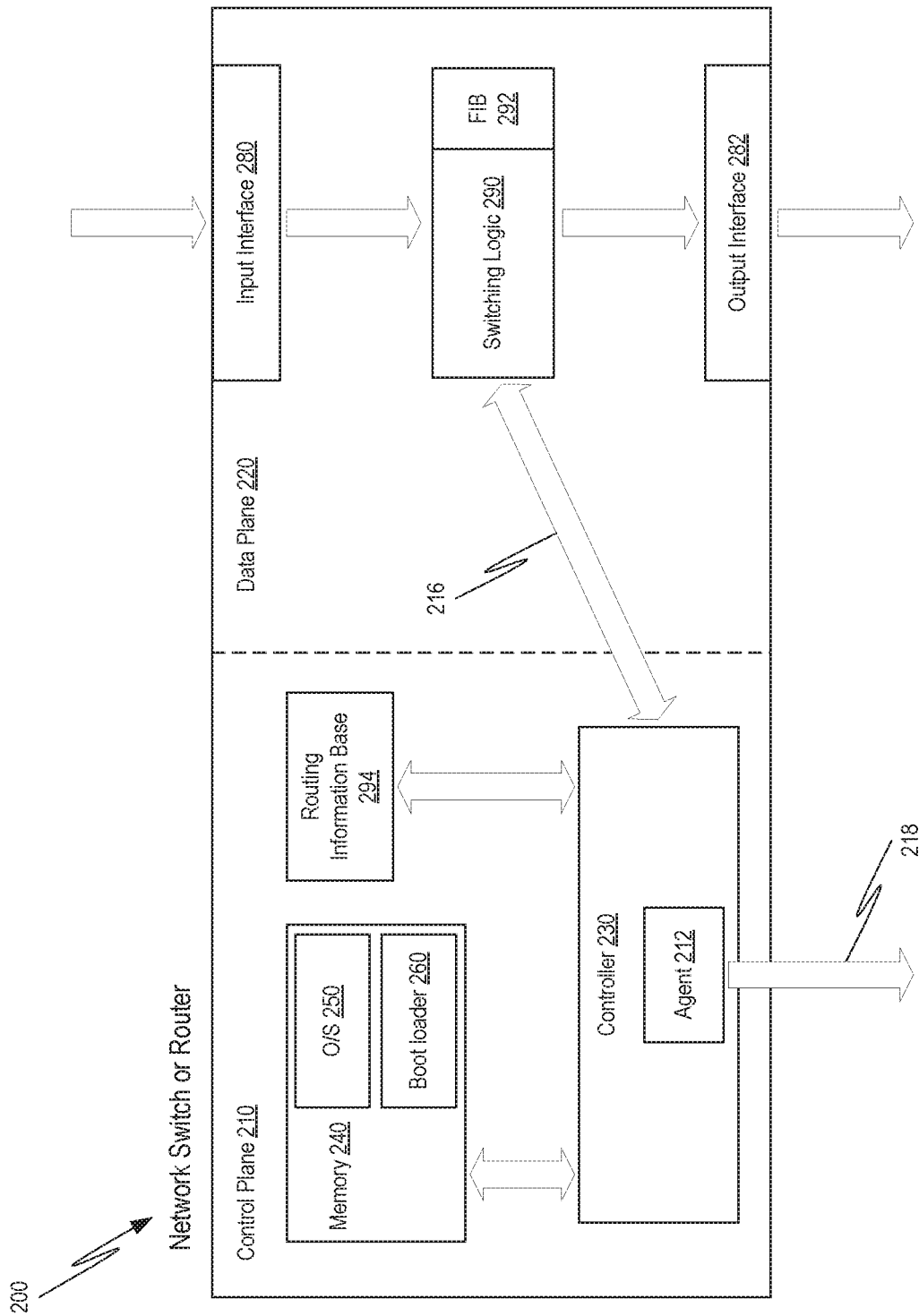
FIG. 2 shows implementation details of an exemplary switch or router employed in the computer network.

FIG. 2 illustrates further details of a network switch or router 200, which may act as a node 110 in network 108. The router 200 includes a control plane 210 and a data plane 220. The control plane 210 is generally a management layer for configuring, updating, and controlling the data plane 220. The control plane 210 includes a controller 230, which can be a Central Processing Unit (CPU), processor, application-specific integrated circuit (ASIC), microcontroller, or any hardware logic that can receive packets and provide switch management and control in response thereto. The controller 230 has access to a memory 240 that can be a Dynamic Random Access Memory (DRAM), Flash memory, or other type of RAM or ROM. The memory 240 is used to store an operating system 250 and a boot loader program 260, which is a first program executed after a reboot of the controller 230. Although a single memory is shown, the memory 240 can be divided into multiple memories and even memories of different types.

A communications bus 216 allows communications between the controller 230 and the data plane 220. The communication bus 216 can be any desired bus type, such as peripheral component interconnect (PCI), PCI express (PCIe), accelerated graphics port (AGP), etc. The data plane 220 includes input interface or ports 280 and output interface or ports 282 used for receiving and sending network packets, respectively. Interfaces 280, 282 provide network connectivity to/from the router. For example, console and auxiliary ports can be used for managing the router. The routers also have ports for LAN and WAN connectivity. The LAN interfaces usually include Ethernet, Fast Ethernet, Fiber Distributed Data Interface (FDDI), or Token Ring. An attachment unit interface (AUI) port is used to provide LAN connectivity. Alternatively or additionally, the router can be provided with interfaces for asynchronous transfer mode (ATM) as well. The router can also include sync and async serial interfaces, which can be used for WAN connectivity. Alternatively or additionally, the router can include integrated services digital network (ISDN) interfaces, which provide ISDN connectivity can be used to transmit both voice and data.

Switching logic 290 is positioned between the input and output ports. The switching logic 290 includes hardware for switching and can include a routing table, for example, a forwarding information base (FIB 292). The FIB 292 can be programmed by the controller 230 to ensure packets are switched to the proper output port 282. The control plane 210 further includes a routing information base (RIB) 294, which stores prefix information for network devices on the network. The controller 230 can execute regular updates to program the FIB 292 using data within the RIB 294.

Controller 230 may further include an agent 212, which can be a software module that monitor packets transmitted and packets dropped by the network switch or router 200, for example, similar to agent 112 of FIG. 1. In some embodiments, the agent 212 can operate in accordance with SNMP to collect and organize information about the performance of the router 200 in processing packets. For example, the agent 212 can receive information regarding number of packets transmitted and loss via communication bus 216 and can accumulate the information in memory 240. In response to a polling request, for example, from device monitoring module 104 in FIG. 1, the agent 212 can retrieve the accumulated information from memory 240 and send an appropriately formatted message indicating number of packets transmitted and lost in a requested time period. The agent 212 may send the formatted message to the device monitoring module 104 via separate communication link 218 or via the network through output interface 282. In some embodiments, the agent 212 can instead operate in accordance with network or streaming telemetry protocol. In such embodiments, the agent 212 automatically sends information regarding packet transmission and loss rate to the device monitoring module 104 according to a predetermined schedule (e.g., every minute) or continuously.

Figure 3:
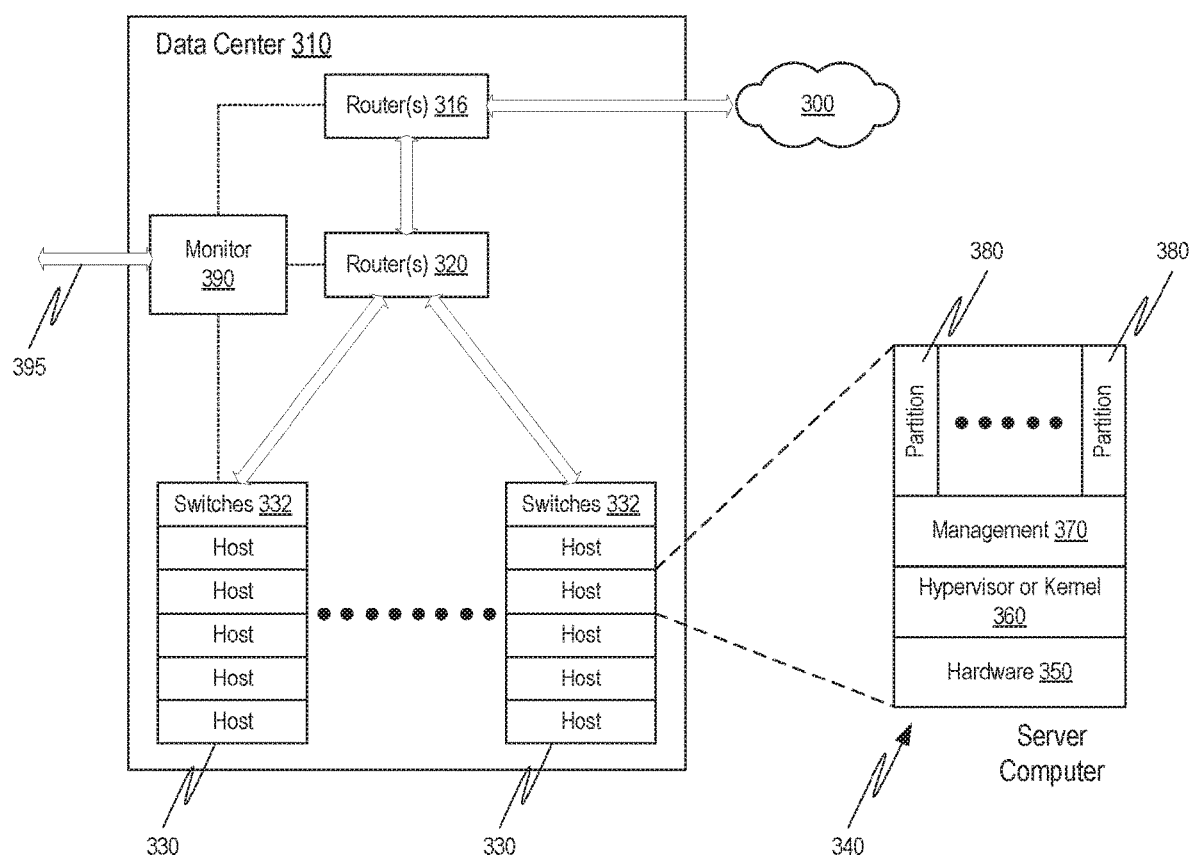
FIG. 3 illustrates an exemplary data center within a compute service provider that transmits packets through a computer network.

FIG. 3 illustrates further details of a network data center 310. The data center 310 is coupled together by one or more routers 316, which read address information in a received packet and determine the packet's destination. If the router 316 decides that the packet is bound for a border network, then the packet is forwarded to that border network as indicated at 300. If the packet is addressed to a host in the data center 310, then it is passed to one or more additional routers 320, which route the packets to one or more racks of host server computers 330. Each rack can include a switch 332 coupled to multiple host server computers.

A particular host server computer is shown in an expanded view at 340. Each host 340 has underlying hardware 350 including one or more CPUs, memory, storage devices, etc. Running a layer above the hardware 350 is a hypervisor or kernel layer 360, which may be classified as a type 1 or type 2 hypervisor. A type 1 hypervisor runs directly on the host hardware 350 to control the hardware and to manage guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 370 can be part of the hypervisor or separated therefrom and generally includes device drivers needed for accessing the hardware 350. The partitions 380 are logical units of isolation by the hypervisor. Each partition 380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Any applications executing on the instances can be monitored using the management layer 370.

The data center 310 can further include a network monitor 390. In some embodiments, network monitor 390 can operate similar to central network monitor 100 of FIG. 1. Thus, network monitor 390 can receive information regarding packet transmission and loss at each node, e.g., switches 332, routers 318, and routers 320, and can use that information to estimate the end-to-end packet loss for respective source-destination pairs. Alternatively, in some embodiments, data center 310 is part of a larger network and central network monitor 100 of FIG. 1 operates with respect to that larger network. In such embodiments, network monitor 390 may instead operate similarly to device monitoring module 104 in FIG. 1. For example, network monitor 390 can accumulate information regarding packet transmission and loss at switches 332, routers 318, and routers 320 and can send that information to the central network monitor, for example, via communication link 395.

Figure 4:
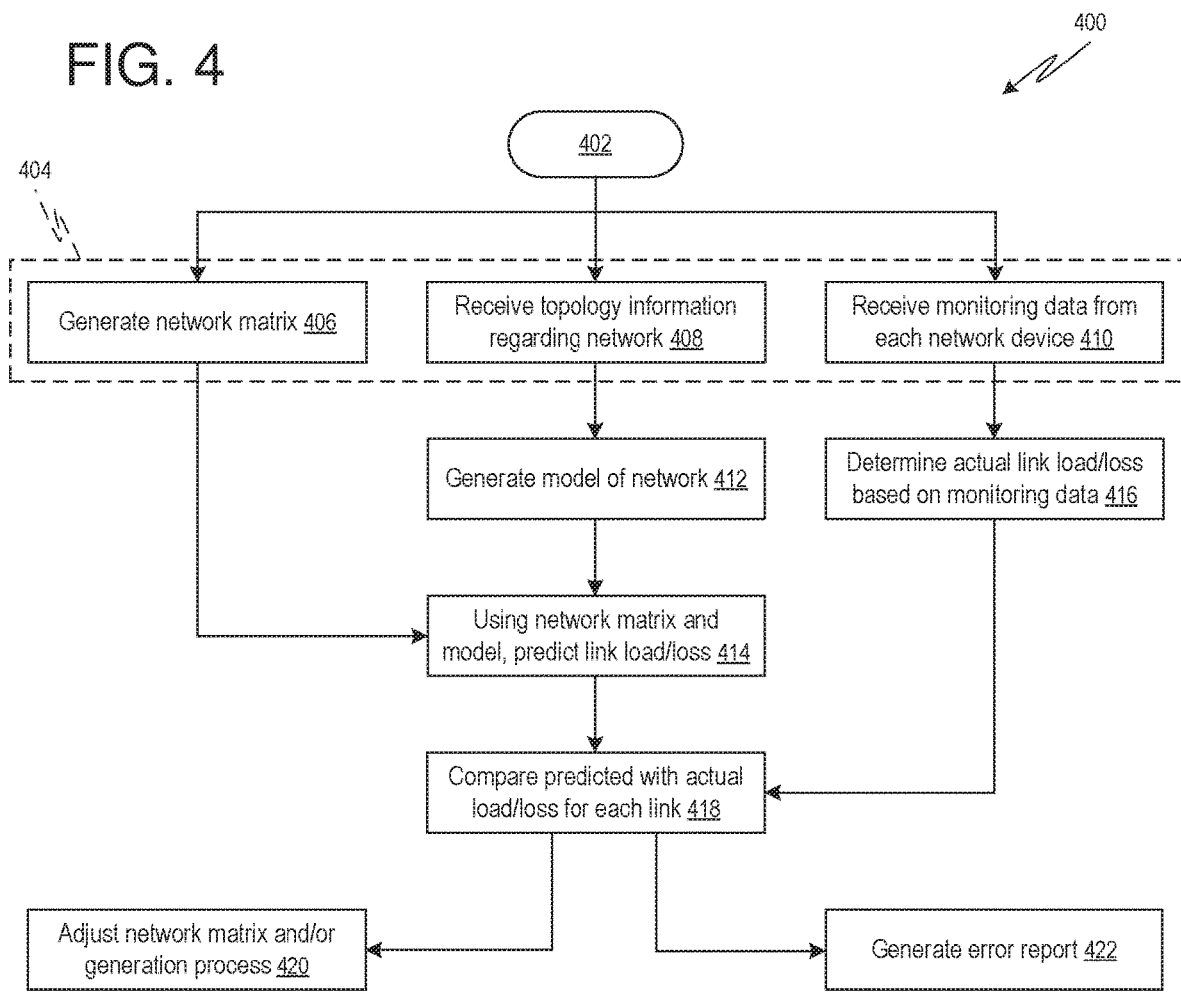
FIG. 4 is a process flow diagram of an exemplary method for automated validation of network traffic or loss matrices.

FIG. 4 depicts an exemplary method 400 for automated validation of network matrices, such as a traffic matrix or a loss matrix. The method 400 can initiate at 402 and proceed to 406-410. At 406, a network matrix is generated, for example, by network matrix module 102. The generated network matrix can be a traffic matrix, which aggregates end-to-end traffic demands between respective source-destination pairs of network devices, or a loss matrix, which aggregates end-to-end losses between the respective source-destination pairs. The network matrix can be generated based on at least one of label-switched path statistics, IP tunnel statistics, network-device-based sampling of traffic flows, and estimation using data regarding packet transmission and loss at each network device interface. At 408, information regarding topology of the network is received, for example, by network topology module 103. The topology information can include physical topology information (e.g., location of network devices and physical connections between network devices) and logical topology information (e.g., routing or forwarding logic of the network devices) to the model. At 410, passive monitoring data from each network device can be received, for example, by device monitoring module 104 from agents 112. The passive monitoring data can include, for example, amounts of packets transmitted and/or packets lost for each network device interface in a particular period of time (e.g., one minute). The passive monitoring data may be transmitted in response to a polling request, for example, in accordance with SNMP, or automatically without any polling, for example, by streaming telemetry.

The processes 406-410 are performed with respect to the same time period 404 of network operation. That is, the network matrix formed at 406 applies to a certain time period (e.g., a particular hour), and the topology information received at 408 reflects the state of the network during that time period. Similarly, the monitoring data received at 410 reflects measurements obtained during that time period; however, in some embodiments, the data may be received at a more frequent time scale (e.g., every minute or even continuously) and combined together over the extent of that time period. Note that this does not require that processes 406-410 be performed simultaneously; rather, 404 merely indicates that the network operating period to which processes 406-410 relate are the same, such that the link performance values predicted based on the network matrix and the network model can be properly correlated with the measured link performance values for validation of the network matrix.

From 408, the method 400 can proceed to 412, where a model of the network is generated based on the received topology information. For example, the model generation can be performed by network topology module 103. The model can include, for each source-destination pair, an inferred end-to-end path composed of individual links between network devices. The method 400 can then proceed to 414, where the network matrix from 406 and the model from 412 are employed in a simulation to predict performance (e.g., traffic load or loss) at each link. For example, the simulation prediction can be performed by network simulation module 105. In some embodiments, the performance for each link is predicted using the end-to-end paths suggested by the model and the end-to-end performance values (e.g., traffic load or loss) suggested by the network matrix for each source-destination. Simultaneously or sequentially, the actual performance values for each link are determined at 416, for example, by device monitoring module 104.

The method 400 can proceed to 418, where the predicted performance values for each link from 414 are compared with the actual performance values for each link from 416. For example, the comparison can be performed by validation module 107. In some embodiments, comparison 418 can include determining a difference between the predicted performance value (e.g., traffic load) and the actual or measured performance value (e.g., traffic load) for each link, and then identifying each link that has a determined difference exceeding a threshold or that exceeds a percentage of the measured performance value. In some embodiments, the comparison 418 can further include identifying each source-destination pair in the network matrix from 406 that has an end-to-end path including one or more of the identified links based on the model generated at 412.

In some embodiments, the results of comparison 418 can be provided to an operator or provider of the network, for example, via an interactive user-interface or provided to a downstream system or service via an API. The method 400 can thus optionally proceed to 420, where the network matrix at 406 and/or the process underlying the matrix generation at 406 is adjusted based on the comparison 418, and/or optionally proceed to 422, where an error report is generated. For example, an owner or operator can be alerted that a particular link and/or end-to-end path is non-compliant. The process at 420 can thus include confirming that traffic flow monitors are properly enabled for that link and/or checking that traffic on that link is not bypassing traffic flow monitors. Alternatively or additionally, the adjustment 420 can be performed by an optimization module that automatically adjusts the network matrix or the underlying process for generating the network matrix to reduce the differences calculated in comparison 418. For example, such adjustment 420 may occur by an iterative feedback process, where matrix generation 406, topology information receipt 408, passive monitoring 410, model generation 412, simulation to predict performance values 414, determination of actual performance values 416, and validation 418 are repeated after adjustment 420.

Figure 5:
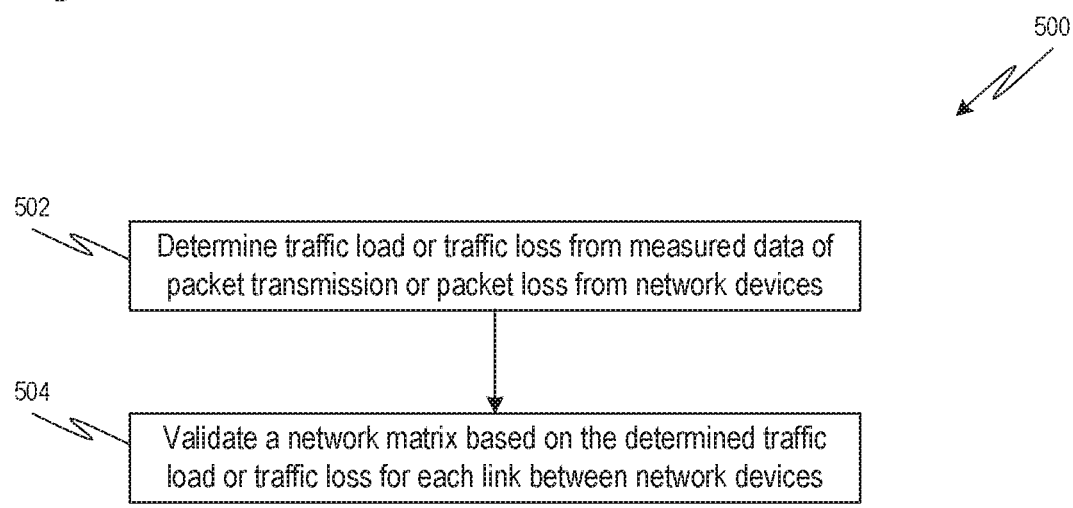
FIG. 5 is a process flow diagram of another exemplary method for automated validation of network traffic or loss matrices.

FIG. 5 depicts an exemplary method 500 for automated validation of network matrices, such as a traffic matrix or a loss matrix. The method 500 can initiate at 502, where traffic load and/or traffic loss at each link between network devices in a network is determined based on measured data regarding quantities of packet transmission or lost by the network devices in a particular period of time. In some embodiments, the determination at 502 may be in a manner similar to that described above for 416 in FIG. 4. The data regarding quantities of packets transmitted and lost can be collected by an agent, for example, agent 112 of FIG. 1 or agent 312 of FIG. 3. The collected data may be periodically (e.g., every minute) or continuously reported by the agent to a central network monitor, such as network monitoring system 100 of FIG. 1, for example, in a manner similar to that described above for 410 in FIG. 4.

The method 500 can then proceed to 504, where the network matrix is validated based on the determined traffic loads and/or traffic losses at the links between network devices. In some embodiments, the validation 504 can include comparing predicted traffic loads and/or traffic losses for each link with the determined traffic loads and/or traffic losses for each link, for example, in manner similar to that described above for 414 in FIG. 4. The predictions are based on the network matrix and a model of the network. For example, the network matrix may be generated in a manner similar to that described above for 406, while the network model may be generated in a manner similar to that described above for 412 in FIG. 4. In some embodiments, the validation 504 can further include generating an output of the comparison, such as an error report (e.g., indicating non-compliant links or end-to-end paths between source-destination pairs including non-compliant links), a data file of results of the comparison (e.g., values of the difference between predicted and measured performance for each link), and/or a signal responsive to the comparison (e.g., an error or alarm signal indicating a non-compliant link or a difference for one or more links exceeding a predetermined threshold).

Figure 6:
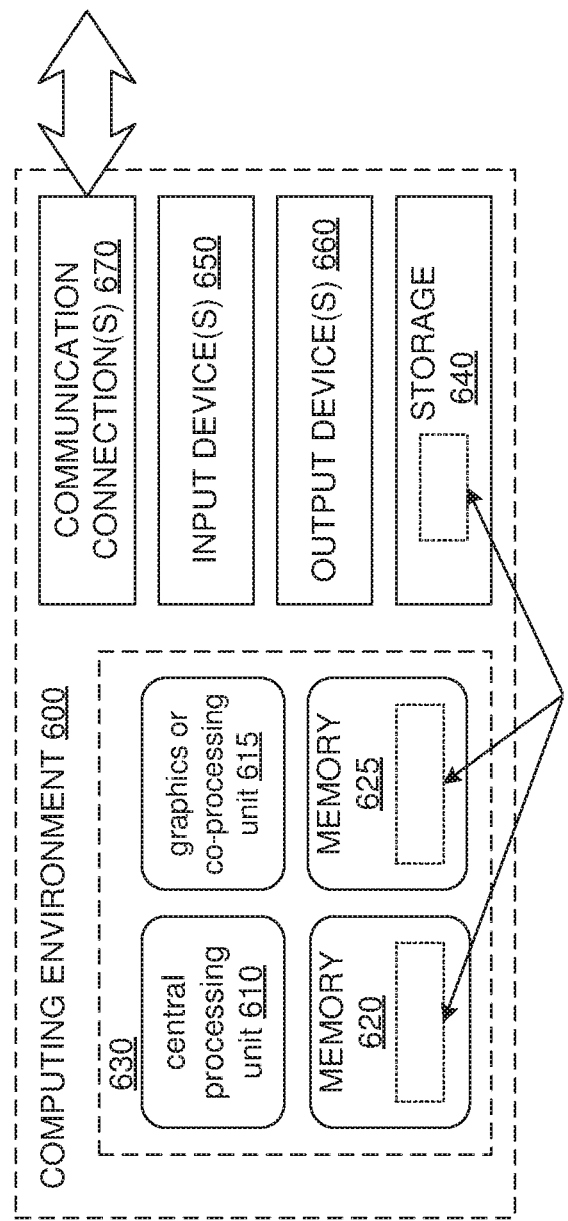
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 is any of a variety of computing devices (e.g., desktop computer, laptop computer, server computer, tablet computer, etc.).

The computing environment 600 includes one or more processing units 610, 615 and memory 620, 625. In FIG. 6, this basic configuration 630 is included within a dashed line. The processing units 610, 615 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way, and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer-implemented method comprising:
   generating a traffic matrix that aggregates end-to-end traffic demands between respective source-destination pairs of network devices in a computer network during a first time period;
   generating a model of the network based on physical and logical topologies of the network during the first time period;
   for each link between network devices in the network, predicting traffic load on the link based on the traffic matrix and the model of the network;
   from each network device, receiving first data of packet transmission measured during the first time period;
   for each link between network devices in the network, determining traffic load on the link based on the first data; and
   comparing the predicted traffic loads with the determined traffic loads for the links.

2. The method of claim 1, wherein the traffic matrix is generated based on label-switched path statistics, IP tunnel statistics, network-device-based sampling of traffic flows, or estimation using data regarding traffic flows on the plurality of links.

3. The method of claim 1, wherein:
the receiving first data from the network devices comprises communication according to simple network management protocol (SNMP) or streaming telemetry.

4. The method of claim 1, wherein the comparing comprises:
determining a difference between the predicted traffic load and the determined traffic load for each link;
identifying each link that has a determined difference exceeding a threshold; and
based on the generated model, identifying each source-destination pair in the traffic matrix that has an end-to-end path including one or more of the identified links.

5. The method of claim 1, wherein the comparing comprises:
determining a difference between the predicted traffic load and the determined traffic load for each link; and
generating an error report that indicates each link where the difference exceeds a threshold.

6. The method of claim 1, further comprising:
adjusting the traffic matrix or a process used to generate the traffic matrix to reduce a difference between the predicted traffic loads and the determined traffic loads.

7. One or more non-transitory computer-readable storage media collectively storing computer-executable instructions that, when executed by one or more computer systems, configure the one or more computer systems to collectively perform operations comprising:
validating a network matrix based on traffic load or traffic loss for each link between network devices in a network, the traffic load or traffic loss being determined from measured data of packet transmission or packet loss from the network devices; and
adjusting the network matrix or a process used to generate the network matrix based on the validating.

8. The one or more non-transitory computer-readable storage media of claim 7, wherein the network matrix corresponds to a time period, and the data of packet transmission or packet loss is measured for the same time period.

9. The one or more non-transitory computer-readable storage media of claim 7, wherein the media collectively store additional computer-executable instructions that, when executed by the one or more computer systems, configure the one or more computer systems to collectively perform further operations comprising:
generating the network matrix as a traffic matrix that aggregates end-to-end traffic demands between respective source-destination pairs of network devices in the network,
wherein the validating is based on traffic load for each link determined from measured data of packet transmission from the network devices.

10. The one or more non-transitory computer-readable storage media of claim 9, wherein the traffic matrix is generated based on label-switched path statistics, IP tunnel statistics, network-device-based sampling of traffic flows, or estimation using data regarding traffic flows on the plurality of links.

11. The one or more non-transitory computer-readable storage media of claim 7, wherein the media collectively store additional computer-executable instructions that, when executed by the one or more computer systems, configure the one or more computer systems to collectively perform further operations comprising:
generating the network matrix as a loss matrix that aggregates end-to-end traffic loss between respective source-destination pairs of network devices in the network,
wherein the validating is based on traffic loss for each link determined from measured data of packet loss from the network devices.

12. The one or more non-transitory computer-readable storage media of claim 7, wherein the media collectively store additional computer-executable instructions that, when executed by the one or more computer systems, configure the one or more computer systems to collectively perform further operations comprising:
generate a model of the network based on physical and logical topology of the network during a time period corresponding to that of the network matrix;
for each link between the network devices, predicting traffic load or traffic loss on the link based on the network matrix and the model of the network;
receiving the measured data of packet transmission or packet loss from the network devices; and
determining the traffic load or traffic loss on each link based on the measured data received from the network devices.

13. The one or more non-transitory computer-readable storage media of claim 12, wherein the media collectively store additional computer-executable instructions that, when executed by the one or more computer systems, configure the one or more computer systems to collectively validate the network matrix by:
determining a difference between the predicted traffic load or traffic loss and the determined traffic load or traffic loss for each link;
identifying each link that has a determined difference exceeding a threshold; and
based on the generated model, identifying each source-destination pair in the network matrix that has an end-to-end path including one or more of the identified links.

14. The one or more non-transitory computer-readable storage media of claim 12, wherein the media collectively store additional computer-executable instructions that, when executed by the one or more computer systems, configure the one or more computer systems to collectively validate the network matrix by:
determining a difference between the predicted traffic load or traffic loss and the determined traffic load or traffic loss for each link; and
identifying each link where the difference exceeds a threshold.

15. The one or more non-transitory computer-readable storage media of claim 12, wherein the receiving the measured data from the network devices comprises communication according to simple network management protocol (SNMP) or streaming telemetry.

16. At least one hardware processor; a non-transitory computer-readable storage medium storing instructions, which, when executed by the at least one hardware processor, are configured to implement modules, comprising:
a validation module configured to validate a network matrix based on traffic load or traffic loss for each link between network devices in a network, the traffic load or traffic loss being determined from measured data of packet transmission or packet loss from the network devices;

a device monitoring module configured to receive measured data of packet transmission or packet loss from network devices in the network;

a network topology module configured to generate a model of the network based on physical and logical topology of the network; and a network simulation module configured to predict traffic load or traffic loss on each link between the network devices in the network based on the network matrix and the model of the network.

17. The non-transitory computer-readable medium of claim 16, further configured to implement modules, comprising:

a network matrix module configured to generate the network matrix as a traffic matrix, which aggregates end-to-end traffic demands between respective source-destination pairs of the network devices in the network, using label-switched path statistics, IP tunnel statistics, network-device-based sampling of traffic flows, or estimation using data regarding traffic flows on the plurality of links.

18. The non-transitory computer-readable medium of claim 17, wherein the validation module is configured to:

determine a difference between the predicted traffic load and the determined traffic load for each link; and identify each source-destination pair of the traffic matrix having an end-to-end path with at least one link whose determined difference exceeds a threshold, or identify each link whose determined difference exceeds the threshold.

* * * * *